Dec. 5, 1933.  W. J. KELLER  1,938,340
KEROSENE LAMP BURNER
Filed March 5, 1932
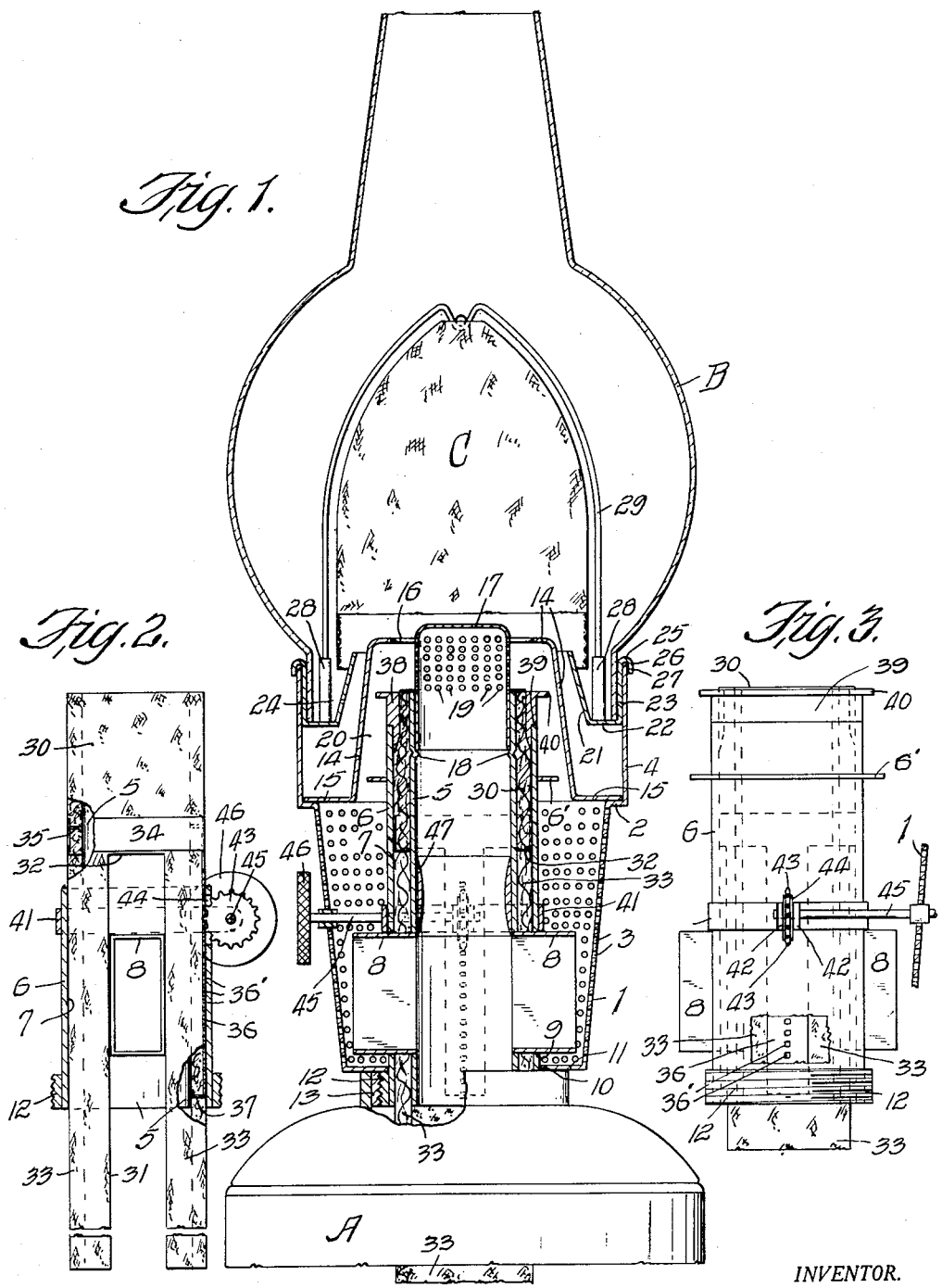
INVENTOR.
W. J. Keller
BY
ATTORNEY.

Patented Dec. 5, 1933

1,938,340

UNITED STATES PATENT OFFICE 1,938,340

KEROSENE LAMP BURNER

William J. Keller, St. Louis, Mo.

Application March 5, 1932. Serial No. 596,996

5 Claims. (Cl. 67—38)

My invention relates to kerosene lamp burners.

The object of my invention is to provide a burner for kerosene lamps embodying a burner construction having a central vertically disposed air passage and a concentrically arranged wick passage, said wick passage being interrupted by laterally directed air intake tubes providing passages into the central air passage.

A further object of the invention resides in the provision of means for compressing the upper, or tubular flame end of a wick, the remaining portion of which wick is provided with slotted passages to span the air intake tubes.

A still further object of the invention resides in providing a perforated basket, which supports the burner tubes, with a shoulder for supporting a removable deflector cap.

A still further object of the invention resides in the provision of a mantle and chimney holder which is detachably mounted upon the upper edge of the basket.

A still further object of the invention resides in providing the tubular portion of the wick with a band having a leg extension provided with gear teeth receiving openings engaging one of the legs of the wick and clamped at its free end thereto to prevent displacement of the leg, which leg is also used as a stiffened guide to facilitate inserting the wick in the wick passage of the burner tubes.

A still further object of the invention is the provision of a kerosene lamp burner, which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawing forming a part of this specification, wherein like characters of reference denote similar parts throughout the several views:

Fig. 1 is a vertical sectional view of a kerosene lamp burner embodying the features of my invention, and, it is shown as associated with a lamp fount, a chimney and an incandescent mantle.

Fig. 2 is a detail in side elevation of the lamp wick and stiffening means carried thereby.

Fig. 3 is a detail showing the means employed for raising and lowering the wick.

Referring to the drawing, the reference numeral A designates a suitable lamp fount, B, the chimney and C, an incandescent mantle.

In carrying out the aim of my present invention, I employ a metallic basket 1 of suitable design, which is provided at a predetermined position between the upper and lower edges thereof, with an internal shoulder, or ledge 2. The basket below the shoulder 2 is provided with a multiplicity of suitable openings 3, and that portion of the basket above the shoulder 2 and designated 4, is non-perforated. This upper end 4 of the basket 1 is preferably cylindrical.

Positioned centrally of the basket 1 and its upper end 4, is a burner construction embodying an open ended inner air conducting tube 5 and an open ended outer tube 6 which is arranged concentrically with the inner tube and spaced therefrom a predetermined distance to provide an annular wick passage 7.

The inner or air conducting tube 5 is provided on opposite sides thereof, adjacent its lower edge, with a pair of open ended air inlet tubes 8, which are directed laterally therefrom, but only of such length as to be fully disposed within the basket 1. The air inlet tubes are shown as rectangular in shape, although they may be cylindrical, or of other shape, if so desired. The air inlet tubes are suitably fixed at their inner ends in openings in the tube 5 and pass through openings 9 in the outer tube 6 and act as supports for the outer tube to which it is secured to prevent concentric displacement thereof relative to the inner air tube 5.

The lower ends of the inner and outer tubes 5 and 6 pass through a central opening 10 in the lower end wall 11 of the basket 1 and the outer tube is provided at its lower end below the basket with an externally screw threaded ring 12 for screw threaded connection with an internally screw threaded ring 13 on the upper open end of the lamp fount A. The outer tube 6 is suitably secured at its lower end to the lower wall 11 of the basket 1 to hold the inner and outer tubes 5 and 6 in a fixed upright position centrally of the basket 1.

A suitable air deflector cap 14 is positioned within the upper end 4 of the basket 1 and is provided at its lower end with outwardly directed flange 15, the marginal edge of which is adapted to rest upon the internal flange 2 of the basket 1 for supporting the cap in position within the upper end of the basket. The upper end of the deflector cap is provided with a central opening 16 through which passes a suitable generator cap 17 which has detachable telescopic connection with the upper end of the air tube 5. The generator cap 17 is held from entering the air tube 5 beyond a predetermined point by means of suitable protrusions 18 formed in and inwardly of the wall of the air tube 5. The generator cap 17 is provided with a multiplicity of wall openings 19.

The side walls of the deflector cap are preferably directed upwardly and inwardly to provide a tapered air passage 20 around the upper end of the outer tube 6, and into the lower end of which extends an air breaker ring 6' fixed to the outer tube 6.

A combined chimney and mantle holder is positioned within the upper end 4 of the basket 1 and consists of a tubular truncated cone shaped wall 21 open at both ends, and the upper edge of said wall is adapted to lie a suitable distance below the upper end of the deflector cap 14. The lower edge of the wall 21 is directed or flanged outwardly a suitable distance to provide a bottom wall 22, which is directed upwardly to form a vertical wall 23 adapted for telescopic connection with the upper end of the wall 4 of the basket 1. An annular channel 24 is formed between the walls 21 and 23 to receive the lower end of the chimney B which rests upon the wall 22. The upper end of the vertical wall 23 is flanged outwardly, as at 25, and then downwardly, as at 26, to provide an annular channel 27 to receive the upper end of the wall 4 of the basket 1 for detachably supporting the holder upon the upper edge of the basket.

A pair of suitable posts 28 are fixed at their lower ends to the wall 22 of the holder and they are oppositely disposed so as to receive an arched wire 29 for supporting the mantle C in a suspended position with its lower edge disposed in the channel 24 of the holder.

In connection with the burner, I employ a suitable fabric wick, which is tubular at its upper end and designated 30. The wick is not tubular from its upper end to its lower end, as it is provided on opposite sides with cut-outs to form slotted openings 31 from the bottom edge of the wick up to a predetermined point designated 32. The upper tubular end of the wick is treated to stiffen the same. The slots 31 divide the lower end of the wick into two flexible legs 33, the extremities of which are adapted to enter the lamp fount, as is manifest, so that kerosene can, by capillary attraction, ascend the wick to the flame end thereof. The slots in the wick are of substantially the same width as the width of the air intake tubes 8, and are provided for the purpose of the wick spanning the air intake tubes.

A suitable light gauge metal ring 34 is applied to the lower end of the tubular end of the wick and is fixed thereto by suitable prongs 35 to prevent displacement of the ring on the wick. Extending downwardly a suitable distance from the lower edge of the ring 34, is a narrow leg 36, the lower end of which is fixed to one of the legs 33 of the wick by means of a suitable prong 37 to stiffen the wick at this point to facilitate the wick being inserted into the wick passage of the burner construction.

The wick is inserted into the wick passage 7 from the upper end of the burner construction and the air inlet tubes pass through the slotted passages of the wick. After the wick has been properly positioned, I apply a suitable ring 38 into the upper end of the wick passage 7 between the outer face of the wick and the inner face of the outer tube 6, and this ring is adapted to squeeze, or compress the upper end of the wick to densify the fabric material thereof. The ring 38 is provided with an annular shoulder 39 to act as a stop to limit downward telescopic movement of the ring 38 with the outer tube 6. The upper edge of the wick compressing ring 38 is provided with an outwardly directed air breaking flange 40 which lies in the deflector cap passage 20 above the air breaker ring 6'.

A suitable metallic band 41 is fixed to the outer tube 6 adjacent the upper ends of the air intake tube 8 and its ends are suitably spaced apart and formed into bearing ears 42 between which a suitable gear 43 is positioned to partly lie in a slotted opening 44 in the wall of the tube 6 and with the teeth thereof engaging in suitable openings 36' in the leg 36 extending from the wick ring 34. The gear is fixed to a shaft 45 which is journaled at its inner end in said bearing ears and the outer end of the shaft 45 is journaled in a sleeve bearing fixed to the wall of the basket 1. The outer end of the shaft is provided with a suitable finger manipulating button 46 for turning the wick up or down.

The burner tube 5 may be provided, if desired, with a Venturi member 47 frictionally mounted within the tube above the air inlets thereto.

From the foregoing description, it is evident that I provide a burner construction for kerosene lamps, which is provided with a tubular wick and a mantle, that will, due to the laterally directed air inlets at the lower end of the burner, admit air into the tube 5 in close proximity to the flame of the wick, thus providing for more perfect combustion and economy in fuel than where air is admitted from a more remote place from the top of the burner. Also, it will be observed that the deflector cap, the combined chimney and mantle holder and the wick compression ring are readily detachable, as well as the generator cap, thus facilitating the replacement of wicks and the cleaning of the burner parts.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. A kerosene lamp burner having, in combination, a basket the lower portion of which is perforated, an interior shoulder on said basket, a pair of concentrically arranged tubes to form a wick passage therebetween, the inner one of said tubes acting as an air conducting tube, opposed air inlets for admitting air into the inner tube near the lower end thereof, the outer of said tubes being fixed to and supported by the basket, a tubular wick receivable in said passage, said wick being slotted longitudinally to pass the air inlets, a flanged ring member for compressing the wick at its upper end portion, a deflector cap detachably mounted on the shoulder of the basket, a detachable generator cap for the inner tube, a combination chimney and mantle holder detachably mounted on the upper edge of the basket and air deflecting means disposed between the outer tube and the deflector cap.

2. In a kerosene lamp, a burner comprising a pair of concentrically arranged tubes to provide a central air passage and a surrounding wick passage, the air passage communicating near its lower end with lateral air intake passages, a tubular wick having opposed slits so the lower portion of the wick can pass the air intake passages, a baffle on the outer tube, a removable flanged ring having telescopic connection with the upper end of the outer tube for compressing the upper edge portion of the wick, a metallic band embracing the wick above the slits thereof, a perforated leg depending from said band and embedded in the wick material, means for securing the lower end of said leg to the wick material and toothed rotatable means for engaging the perforated leg for raising and lowering the wick.

3. In a kerosene lamp, a burner construction comprising a pair of spaced concentrically arranged tubes having lateral air inlets, a wick having a split portion in the passage between the tubes, a removable ring like member on the upper end of the outer tube, a Venturi tube within the inner tube, a band embracing the wick above the slits thereof, a perforated leg depending from the band and embedded in the wick material and means for engaging the perforated leg for raising and lowering the wick.

4. A kerosene lamp burner having, in combination, a basket the lower portion of which is perforated, an interior shoulder on said basket, a pair of concentrically arranged tubes to form a wick passage therebetween, the inner one of said tubes acting as an air conducting tube, opposed air inlets for admitting air into the inner tube near the lower end thereof, the outer of said tubes being fixed to and supported by the basket, a tubular wick receivable in said passage, said wick being slotted longitudinally to pass the air inlets, a removable member for telescopic connection with the outer tube for compressing the upper end portion of the wick, a removable deflector cap mounted on the interior shoulder of the basket, a detachable generator cap for the inner tube and a combination chimney and mantle holder detachably mounted on the upper edge of the basket and having telescopic connection with the basket.

5. In a kerosene lamp burner construction, a perforated basket, an internal shoulder on said basket, a pair of spaced tubes, laterally directed air inlet tubes connected at their inner ends to the tubes adjacent the lower edges thereof, a tubular wick between the spaced tubes, a pair of wick legs extending from the lower edge of said tubular wick, a flanged ring member having telescopic connection with the outermost of said tubes for compressing the upper edge portion of the wick, a deflector cap having a central opening detachably mounted on the shoulder of the basket, a generator cap detachably mounted on the innermost of said tubes and extending into said cap opening and a combined mantle holding and chimney supporting holder detachably mounted on the upper edge of the basket.

WILLIAM J. KELLER.